US005723520A

United States Patent [19]

Akkapeddi et al.

[11] Patent Number: 5,723,520
[45] Date of Patent: Mar. 3, 1998

[54] POLYESTER MOLDING COMPOSITIONS AND ARTICLES EXHIBITING GOOD IMPACT, HEAT AND SOLVENT RESISTANCE

[75] Inventors: Murali Krishna Akkapeddi, Morristown; Bruce VanBuskirk, Dover; Sengshiu J. Chung, Parsippany, all of N.J.

[73] Assignee: AlliedSignal Inc., Morristown, N.J.

[21] Appl. No.: 695,255

[22] Filed: Aug. 9, 1996

Related U.S. Application Data

[63] Continuation of Ser. No. 429,508, Apr. 26, 1995, abandoned.

[51] Int. Cl.$^6$ .......................... C08K 5/098; C08L 67/02
[52] U.S. Cl. .......................... 523/455; 525/176; 525/187; 524/394; 524/494; 524/513
[58] Field of Search .......................... 523/455; 525/176, 525/187; 524/394, 397, 494, 513

[56] References Cited

U.S. PATENT DOCUMENTS

| 3,435,093 | 3/1969 | Cope | 525/166 |
|---|---|---|---|
| 3,516,957 | 6/1970 | Gray, Jr. et al. | 524/315 |
| 3,639,527 | 2/1972 | Brinkmann et al. | 525/64 |
| 4,246,378 | 1/1981 | Komelanie et al. | 525/438 |
| 4,284,540 | 8/1981 | Iida et al. | 525/176 |
| 4,322,335 | 3/1982 | Nield | 523/522 |
| 4,344,874 | 8/1982 | Akagi et al. | 524/394 |
| 4,357,268 | 11/1982 | Vanderkooi, Jr. et al. | 524/285 |
| 4,486,564 | 12/1984 | Deyrup | 524/308 |
| 4,551,485 | 11/1985 | Ragan et al. | 523/212 |
| 4,753,980 | 6/1988 | Deyrup | 524/394 |
| 4,912,167 | 3/1990 | Deyrup et al. | 525/166 |
| 4,914,152 | 4/1990 | Miyashita et al. | 525/176 |
| 4,914,156 | 4/1990 | Howe | 525/166 |
| 4,968,731 | 11/1990 | Lausberg et al. | 523/522 |
| 5,091,459 | 2/1992 | Howe | 524/456 |
| 5,436,296 | 7/1995 | Swamikannu et al. | 525/176 |
| 5,457,150 | 10/1995 | Ohmae et al. | 525/176 |
| 5,523,135 | 6/1996 | Shiwaku et al. | 524/513 |

FOREIGN PATENT DOCUMENTS

| 0 268 287 | 5/1988 | European Pat. Off. |
|---|---|---|
| 0 488 711 | 6/1992 | European Pat. Off. |
| 0 666 285 | 8/1995 | European Pat. Off. |
| 61-012745 | 1/1986 | Japan |
| 85 03718 | 8/1985 | WIPO |
| 91 19767 | 12/1991 | WIPO |

OTHER PUBLICATIONS

Volumn VIII, Kunststoff–Handbuch (Plastics Handbook), "Polyester", pp. 701–703, (Munich 1973).
Van Antwerpen et al., 10 J. Polymer Sci. Polym. Phys. Edn., 2423–2435 (1972).
Legras, et al. 25 Polymer 835–844 (Jun. 1984).
Patent abstract of Japan, vol. 013, No. 278 (C–611), 26 Jun. 1989 & JP.A, 01 075557 (Kanegafuchi Chem. Ind Co Ltd), 22 Mar. 1989.
Patent abstract of Japan, vol. 013, No. 278 (C–611), 26 Jun. 1989 & JP.A, 01 075558 (Kanegafuchi Chem Ind Co Ltd), 22 Mar. 1989.
Patent abstract of Japan, vol. 012, No 382 (C–535), 12 Oct. 1988 & JP.A, 63 128059 (Mitsui Petrochem Ind Ltd), 31 May 1988.

*Primary Examiner*—Tae Yoon
*Attorney, Agent, or Firm*—Roger Criss

[57] ABSTRACT

Molding compositions which are formed by first prereacting a thermoplastic polyester polymer or copolymer with a copolymer of ethylene and a glycidyl acrylate or methacrylate and then subsequently blending with a nucleating agent which is a Group I metal salt of a carboxylic acid to increase the crystallization rate of the polyester. At least one reinforcing component such as glass fibers or reinforcing fillers is preferred. The compositions exhibit a good balance of toughness, rigidity and gasoline resistance and are particularly useful for automotive structural parts such as inner door frames, panels, reinforcements, bumper beams, window surrounds, and other metal replacement applications.

10 Claims, No Drawings

POLYESTER MOLDING COMPOSITIONS AND ARTICLES EXHIBITING GOOD IMPACT, HEAT AND SOLVENT RESISTANCE

This application is a continuation of application Ser. No. 08/429,508 Filed Apr. 26, 1995 now abandoned.

BACKGROUND OF THE INVENTION

1. Field of the Invention

The present invention pertains to molding compositions, and in particular to polyester molding compositions which exhibit a good balance of toughness, rigidity and gasoline resistance. Such are particularly useful for automotive structural parts such as inner door modules, grille opening panels and reinforcements, bumper beams, window surrounds, and other metal replacement applications including such non-automotive, industrial applications such as air conditioner drip pans and motor housings.

2. Description of the Prior Art

It is known in the art that polyethylene terephthalate (PET) is a common thermoplastic semicrystalline polyester which finds widespread use in fibers, films and packaging applications. Although PET exhibits excellent mechanical and thermal properties, once it is oriented and crystallized, its crystallization rate is too slow for conventional injection molding processes. In order to address this problem, a variety of nucleating agents have been used with PET to promote its crystallization and moldability. Suitable nucleating agents are the compounds known to those skilled in the art, such as those described, for example, in Kunststoff-Handbuch (Plastics Handbook), Volume VIII, "Polyester" ("Polyesters"), Carl Hanser Verlag, Munich, 1973, page 701. Such are disclosed in U.S. Pat. Nos. 4,357,268; 4,322,335 and 4,551,485 which are incorporated herein by reference. It is also known that sodium carboxylate salts are efficient nucleators for PET as shown by Van Antwerpen, F. et al. in J. Polym. Sci. Polym. Phys. Edn., 10, 2423 (1972) and Legras, R., et al in Polymer 25, 835 (1984). PET molding compositions employing such sodium carboxylate nucleators are known from U.S. Pat. Nos. 3,435,093; 3,516,957, 3,639,527 and 4,486,564 which are incorporated herein by reference. PET molding compositions containing such nucleators, although exhibiting good mechanical rigidity, are somewhat deficient in impact toughness and ductility as defined by ultimate tensile elongation. U.S. Pat. No. 4,284,540 discloses impact modified PET molding compositions which include an ethylene-glycidyl methacrylate (E-GMA) copolymer as an impact modifier which is used in the presence of a barium salt of a fatty acid. However, this patent teaches against the use of a sodium carboxylate type nucleators for not providing adequate interfacial bonding or reaction between PET and E-GMA. U.S. Pat. No. 4,753,980 discloses the use of terpolymers such as ethylene-ethyl acrylate-glycidyl methacrylate (E-EA-GMA) as impact modifiers for PET. However, these compositions lack adequate solvent resistance such as gasoline resistance.

It would be desirable To provide a thermoplastic polyester molding composition which exhibits a combination of rigidity, impact toughness and gasoline resistance.

SUMMARY OF THE INVENTION

The invention provides a composition suitable for molding which comprises (a) the reaction product of i) at least one thermoplastic polyester containing polymer and ii) at least one copolymer of ethylene and a glycidyl acrylate or methacrylate in which the glycidyl acrylate or methacrylate moiety is present in the copolymer in an amount of from about 2% to about 20% by weight, and wherein the copolymer contains from 0 to about 30% by weight of an unsaturated comonomer selected from the group consisting of $C_3$–$C_{18}$ alpha-olefins, styrenics, and acrylics with a nitrile, ester, amide or imide functionality; and (b) at least one nucleating agent which is a Group I metal salt of a carboxylic acid containing compound in an amount sufficient to increase the crystallization rate of the polyester. The composition preferably further comprises at least one reinforcing component selected from the group consisting of glass fibers and reinforcing fillers in an amount sufficient to increase the heat distortion resistance of the composition as compared to a similar composition without the reinforcing component.

The invention also provides a process for the production of a composition suitable for molding which comprises:

(a) reacting (i) and (ii) to form an intermediate i) at least one thermoplastic polyester containing polymer and ii) at least one copolymer of ethylene and a glycidyl acrylate or methacrylate in which the glycidyl acrylate or methacrylate moiety is present in the copolymer in an amount of from about 2% to about 20% by weight, and wherein the copolymer contains from 0 to about 30% by weight of an unsaturated comonomer selected from the group consisting of $C_3$–$C_{18}$ alpha-olefins, styrenics, and acrylics with a nitrile, ester, amide or imide functionality and then (b) blending the resulting intermediate with at least one nucleating agent which is a Group I metal salt of a carboxylic acid containing compound in an amount sufficient to increase the crystallization rate of the polyester. Preferably a reinforcing component is added during or after the above process steps.

It has been found that the present invention solves the aforementioned deficiencies and provides a composition comprising a mixture of (a) preblend of a thermoplastic polyester and an ethylene copolymer containing an epoxide functionality such as ethylene-glycidyl methacrylate (E-GMA) copolymer; (b) a nucleator which is a Group I metal salt of an organic carboxylic acid containing compound, such as a low molecular weight ethylene-acrylic acid (E-AA) sodium ionomer, and (c) an optional, although preferred, reinforcing component of glass fibers or other reinforcing fillers. The compositions of this invention exhibit good melt processability suitable for producing shaped articles by various types of fabrication processes such as injection molding, gas-assist injection molding, blow molding, extrusion thermoforming and the like. The compositions of this invention exhibit good melt strength and are particularly suitable for gas assist injection molding and blow molding processes by which rigid, hollow-cored, light weight articles can be fabricated. The molded articles exhibit a combination of good rigidity, impact toughness and gasoline resistance desireable in automotive, lawn and power tools, garden equipment and similar applications.

While the preferred polyester is polyethylene terephthalate (PET), including the recycled grade, compositions containing polyethylene naphthalate (PEN) have also been found to be useful compositions since they exhibit unusually high flexural modulus and impact strength.

DETAILED DESCRIPTION OF THE PREFERRED EMBODIMENT

In the practice of the invention, one employs a thermoplastic polyester containing polymer. The thermoplastic polyester polymer useful for the present invention includes homopolymers and copolymers formed by condensing a dicarboxylic acid or an ester forming compound thereof, with an aliphatic or aromatic diol or an ester forming compound thereof. Suitable dicarboxylic acids for preparing polyesters according to the invention non-exclusively include terephthalic acid, isophthalic acid, 2,6-naphthalene dicarboxylic acid, aliphatic dicarboxylic acids such as adipic acid, sebacic acid, azelaic acid, 1,10-decane dioic acid, 1,12-dodecane dioic acid and the like. Suitable aliphatic diols are glycols non-exclusively include ethylene glycol, 1,3-propylene glycol, 1,4-cyclohexane dimethanol, and the like. Suitable aromatic diols include hydroquinone, substituted hydroquinone, bisphenol A, and the like. Other ester forming monomers such as hydroxybenzoic acid and hydroxynaphthoic acid may also be included. Preferred polyesters non-exclusively include, polyethylene terephthalate (PET), polyethylene naphthalate (PEN), poly-1,4-cyclohexane dimethylene terephthalate (PCHT), liquid crystalline polyesters such as aromatic polyesters, including polyhydroxybenzoic-hydroxynaphthoic acid copolymer which is commercially available as Vectra from Hoechst Celanese of Somerville, N.J. Included within the definition of thermoplastic polyester containing polymers within the context of the invention are polyester homopolymers, mixtures of different polyesters, copolymers of different polyesters and copolymers of polyesters with other moieties such polyethers, and the like, as are well known to the skilled artisan. The preferred polyester is PET which may be newly produced virgin PET or may be recycled from soda bottles, fibers, films, and the like. The thermoplastic polyester containing polymers of this invention have a preferred melting point in the range of from about 200° C. to about 330° C. or more preferably from about 220° C. to about 290° C. The PET used in this invention has a preferred intrinsic viscosity as measured in a 60:40 mixture of phenol and tetrachloroethane of from about 0.3 to about 1.2 deciliters/gram.

In forming the composition of the invention, the thermoplastic polyester containing polymer is reacted with at least one copolymer of ethylene having an epoxy functionality such as a glycidyl acrylate or methacrylate. The copolymer of ethylene and a glycidyl acrylate or methacrylate is one in which the glycidyl acrylate or methacrylate moiety is present in the copolymer in an amount of from about 2% to about 20% by weight, and preferably from about 3% to about 10% by weight, and more preferably from about 5% to about 8% by weight. The copolymer may optionally have an additional alpha-olefin moiety to form a terpolymer and wherein the copolymer contains from 0 to about 30% by weight and preferably from 0 to about 5% by weight of the $C_3-C_{18}$ alpha-olefin moiety. The preferred alpha-olefin, when one is used, is propylene. Such compounds may be produced by methods known in the art. Preferred ethylene-glycidyl methacrylate copolymers include IGETABOND, available commercially from Sumitomo Chemical Company, Japan and Lotador 8840 and 8860 from Elf Atochem. The copolymer preferably has a number average molecular weight of from about 10,000 to about 500,000, or more preferably from about 50 to about 300,000 and most preferably from about 100,000 to about 200,000. If the molecular weight is too low, the impact toughness of the overall composition suffer and if the molecular weight is too high, there are flow difficulties during manufacture. The copolymer of ethylene and glycidyl acrylate or methacrylate is preferably present in the overall composition in an amount of from about 3 to about 40 parts by weight per hundred parts of the thermoplastic polyester containing polymer. A more preferred range is from about 5 to about 30 parts by weight and most preferably from about 7 to about 20 parts by weight per hundred parts of the thermoplastic polyester containing polymer.

The next step in producing the composition of the invention is to blend the product resulting from the previous step with at least one nucleating agent which is a Group I metal salt of a carboxylic acid containing compound in an amount sufficient to increase the crystallization of the polyester. It is most preferred that the nucleating agent be blended with the polyester after the copolymer of ethylene and glycidyl acrylate or methacrylate because the nucleating agent and copolymer of ethylene and glycidyl acrylate or methacrylate react with each other preferentially to the polyester. The preferred Group I metal salt is a sodium compound. The salts are preferably prepared by reacting an organic carboxylic acid, including polymers having carboxylic acid moieties, with a Group I metal base to form a Group I metal salt. Suitable carboxylic acid containing compounds includes such aromatic acids as benzoic acid and substituted benzoic acid, aliphatic acids such as pivalic acid, fatty acids such as stearic acid, palmitic acid, dimer acids, and low molecular weight carboxyl containing homopolymers and copolymers of ethylene such as ethylene-acrylic acid, ethylene-methacrylic acid and ethylene-fumaric acid. The preferred nucleating agents are low molecular weight sodium ionomers of ethylene copolymers having a carboxylic acid moiety. The preferred ionomer for this invention is an ethylene-acrylic acid copolymer sodium salt. The Group I metal salts useful for this invention have a preferred number average molecular weight of from about 500 to about 5,000 and more preferably from about 1,000 to about 2,000. The Group I metal salt of a carboxylic acid containing compound is present in an amount sufficient to increase the crystallization rate of the polyester. Such amount that is used should preferably correspond to from about 100 to about 5,000 ppm of sodium and more preferably from about 500 to about 1,500 ppm of sodium based on the weight of the thermoplastic polyester containing polymer.

In the preferred embodiment, the composition of the present invention also contains at least one reinforcing component such as glass fibers and reinforcing fillers. Glass fibers useful for the present composition include chopped glass fibers up to about 5 mm in length. Reinforcing fillers non-exclusively include mica, wollastonite, glass flakes, glass beads, clays and other silicates. The filler component is preferably treated with a sizing agent such as an amino or epoxy silane, phenolic novolak, multifunctional epoxy compound such as bisphenol A-diglycidyl ether, or triglydidyl cyanurates which serves as a surface adhesion promoter. The reinforcing component is present in an amount sufficient to increase the heat resistance of the composition as compared to a similar composition without the reinforcing component. It is preferably present in an amount of from about 5% to about 60%, preferably from about 10% to about 50% and more preferably from about 20% to about 40% based on the total weight of the composition including the polyester, copolymer of ethylene and a glycidyl acrylate or methacrylate, nucleating agent and reinforcing component. The composition may also optionally include other additives known to those skilled in the art such as lubricants, plasticizers, flame retardants, pigments, heat stabilizers, uv stabilizers, antioxidants in minor amounts effective for their indicated purposes. The components of the present invention are preferably combined by melt blending in an extruder by methods well known in the art. In thermoforming applications, the present compositions may be used along with continuous glass fiber reinforcements which may be of the woven or non-woven types.

The compositions of the present invention are useful for manufacturing shaped articles, such as structural automotive parts, by such processes as injection molding, gas-assist injection molding, blow molding, extrusion thermoforming and the like, which preferably have a stiffness as measured by flexural modulus of from about 1,000 to about 15,000 MPa (from about 200,000 to about 2,000,000 psi), preferably from about 4,000 to about 10,000 MPA, (from about 600,000 to about 1,500,000 psi). They have a toughness or crash resistance as measured by a notched Izod impact test strength of at least about 70 Joules/meter (about 1.5 ft lbs/inch) and preferably from about 100 Joules/meter to about 500 Joules/meter (about 2 to about 10 ft.lbs/inch). They have dimensional stability to temperature changes in the range of from about −40° C. to about 80° C. (about −40° F. to about 185° F.). They have a softening temperature of at least about 150° C. and preferably in the range of from about 200° C. to about 280° C. The following non-limiting examples serve to illustrate the invention.

EXAMPLE 1

A dry blend of 42 parts by weight of finely ground recycled polyethylene terephthalate, PET (I.V.=0.7 dl/g, measured in a 60/40 phenol/tetrachloroethane mixture), 18 parts by weight of an ethylene-glycidyl methacrylate (92/8) copolymer (BONDFAST 2C, Sumitomo Chemical co., Japan) and 40 parts by weight of chopped glass fiber (PPG), was fed into the throat of a 2.54 cm Killion single screw extruder (L/D=24/1) and compounded at 280 C. The extrudate was pelletized and dried (step 1). 75 parts of the dry pellets from step 1 were mixed with 25 parts of a PET masterbatch (pre-mixed) containing 4 wt % of a low molecular weight (M.W.=2,000), ethylene-acrylic acid copolymer sodium salt (E-AA, Na ionomer, AClyn® 285, AlliedSignal) and the mixture was extruded again in the same extruder at 290 C. and the extrudate was pelletized (step 2). The final compound contained 55% PET (component A), 13.5% E-GMA (component B), 1% of Na ionomer, herein after referred to as the Na nucleator (component C) and 30% glass fiber (component D). In comparative example 1, a similar extrusion was done with a mixture of 75 parts of the pellets from step 1 and 25 parts of pure PET pellets (containing no nucleator). The final compounded pellets from both cases were dried and injection molded into standard ASTM tensile and flexure test bars (Arburg injection molder, barrel temperature=280 C. and mold temperature=85 C.). The bars were tested according to ASTM methods to measure the properties (Table 1).

EXAMPLE 2

A dry pellet/pellet blend of 54.5 parts of recycled PET and 3.5 parts of E-GMA (94/6) copolymer (Lotador 8840, Atochem) was fed into the throat hopper of a twin-screw extruder (Leistritz, 28 mm co-rotating, L/D=40) equipped with ten separately heated, mixing zones and two downstream feed ports (at zones 4 and 6). As these components were being melt blended at 280 C., a dry mixture of 30 parts of glass fiber and 12 parts of a PET masterbatch containing 10% Na nucleator (Aclyn 285) was added to the melt stream through the down stream feed port at the zone 6. The mixture was extruded at 286 C. at a throughput rate of 30 lbs/hr and the resulting extrudate was pelletized and dried. The blend had a final composition of 65.2% PET, 3.5% E-GMA, 1.2% Na carboxylate nucleator and 30% glass fiber. The blend was injection molded and tested as before and the properties are shown in Table 1. Comparative example 2, containing no E-GMA, was similarly compounded, molded and tested as above.

EXAMPLES 3–7

In these examples the ratio of PET to E-GMA was varied while maintaining the Na nucleator level at 1.2% and glass fiber level at 30%. The method of compounding was similar to that described in Example 2 and as before, the Na nucleator (C) was always added down stream at zone 6 after PET (A) and E-GMA (B) have been mixed first in the melt. The various blend compositions were molded and tested as described before. Note the increase in the notched Izod impact strength and tensile elongation at break with the E-GMA content, while maintaining high DTUL (Table 1).

TABLE 1

| | Ex. 1 | Comp. Ex. 1 | Comp. Ex. 2 | Ex. 2 | Ex. 3 | Ex. 4 | Ex. 5 | Ex. 6 | Ex. 7 |
|---|---|---|---|---|---|---|---|---|---|
| Composition: | | | | | | | | | |
| A. PET (%) | 55.5 | 56.5 | 54.8 | 65.2 | 61.8 | 58.3 | 54.8 | 52.8 | 50.8 |
| B. E-GMA (%) | 13.5 | 13.5 | 0 | 3.5 | 7 | 10.5 | 14 | 16 | 18 |
| C. Na nucleator | 1 | 0 | 1.2 | 1.2 | 1.2 | 1.2 | 1.2 | 1.2 | 1.2 |
| D. Glass fiber (%) | 30 | 30 | 30 | 30 | 30 | 30 | 30 | 30 | 30 |
| Process | | | | | | | | | |
| | 2-pass, single screw | 2-pass, single screw | 1-pass, twin screw | 1-pass, twin screw | 1-pass, twin screw | 1-pass, twin screw | 1-pass, twin screw | 1-pass, twin screw | 1-pass, twin screw |
| Initial feed (at throat) | A + B + D (1st), reextrude w/C | A + B + D (1st), reextrude w/A | A | A + B | A + B | A + B | A + B | A | A |
| Downstream feed (tw. scr., Z4) | — | — | — | — | — | — | — | B + D | B + D |
| Downstream feed (tw. scr., Z6) | — | — | C + D | C + D | C + D | C + D | C + D | C | C |
| Melt temperature (°C.), avg. | 290 | 290 | 290 | 286 | 286 | 281 | 264 | 264 | 262 |
| Properties | | | | | | | | | |
| Notched Izod J/m (ftlb/in), 23° C. | 230 (4.3) | 165 (3.1) | 96 (1.8) | 117 (2.2) | 139 (2.6) | 160 (3.0) | 165 (3.1) | 176 (3.3) | 182 (3.4) |
| Flex. Modulus MPa (Kpsi) | 6250 (907) | 6607 (959) | 8365 (1214) | 7855 (1140) | 7276 (1056) | 6862 (996) | 6462 (938) | 6422 (932) | 5912 (858) |
| Flex. strength MPa | 167 (24.2) | 139 (20.2) | 222 (32.2) | 214 (31) | 200 (29.1) | 188 (27.3) | 178 (25.8) | 168 (24.4) | 159 (23.1) |

TABLE 1-continued

|  | Ex. 1 | Comp. Ex. 1 | Comp. Ex. 2 | Ex. 2 | Ex. 3 | Ex. 4 | Ex. 5 | Ex. 6 | Ex. 7 |
|---|---|---|---|---|---|---|---|---|---|
| (Kpsi) |  |  |  |  |  |  |  |  |  |
| Tensile strength MPa (Kpsi) | 109 (15.4) | 91 (13.2) | 132 (19.2) | 123 (17.8) | 118 (17.1) | 114 (16.6) | 105 (15.2) | 100 (14.6) | 98 (14.3) |
| Elongation at break (%) | 3.2 | 3.5 | 2.7 | 3.2 | 4 | 4.6 | 6.5 | 6.5 | 6.9 |
| DTUL °C. @ 182 MPa (264 psi) | 161 | 72 | 210 | 207 | 198 | 197 | 182 | 177 | 179 |

Examples of the molding compositions of this invention based on PET and E-GMA blends Table 1 shows that the addition of 1% of a low molecular weight sodium carboxylate ionomer (E-AA, Na) as a nucleator significantly improves the heat resistance (DTUL) of the 30% glass filled PET/E-GMA (80/20) blend (see Table 1-Example 1 vs. Comparative Example 1). Examples 2 to 7, indicate the improvement in notched Izod impact strength and elongation at break, by blending varying amounts of E-GMA copolymer with PET, compared to the Comparative Example 2 containing no E-GMA. In all cases, the sodium carboxylate ionomer nucleator was added after first blending the PET and E-GMA, either as stepwise extrusion in single screw extruder or more preferably as a 1-pass sequential blending operation in a twin-screw extruder, using down stream feed ports.

EXAMPLES 8–11

In these examples the ratio of the components was essentially constant but the order of addition of the components was varied as indicated in Table 2. The key difference was whether the Na nucleator (C) was added after the preblending of E-GMA and PET (Examples 10 & 11) or before (Examples 8 & 9). Note the higher notched Izod & elongation at break obtained in Ex. 10 & 11, in which the nucleator was added after the preblending of PET and E-GMA.

E-GMA. Higher notched Izod and elongation at break in Examples 10 and 11 relative to Examples 8 and 9 illustrate this point.

EXAMPLE 12

A 70/30 blend of PET and E-GMA was extruded on a 2.54 cm Killion single screw extruder (L/D=24) equipped with a Maddock mixer, at a melt temperature of 280 C. The extrudate was pelletized, dried and injection molded into standard ASTM tensile bars (3 mm thickness). The test bars were immersed in a large jar of unleaded gasoline. The amount of gasoline absorption in the tensile bars were measured gravimetrically after 7 days and 21 days of immersion respectively (Table 3). In the comparative example #3, a similarly extruded and molded sample of a blend containing 30% of ethylene-ethyl acrylate-glycidyl methacrylate (68/24/8) terpolymer (E-EA-GMA, Lotador 8860, Atochem) was tested for gasoline absorption. Note the superior gasoline resistance of the composition containing E-GMA (Ex. 12) vs that containing E-EA-GMA (Comp.Ex.3).

TABLE 2

|  | Example 8 | Example 9 | Example 10 | Example 11 |
|---|---|---|---|---|
| Composition: |  |  |  |  |
| A. PET (%) | 55 | 55 | 54.8 | 54.8 |
| B. E-GMA (%) | 14 | 14 | 14 | 14 |
| C. Na nucleator (%) | 1 | 1 | 1.2 | 1.2 |
| D. Glass fiber (%) | 30 | 30 | 30 | 30 |
| Process |  |  |  |  |
|  | 1-pass, twin screw extr. | 1-pass, twin screw extr. | 1-pass, twin screw extr. | 1-pass, twin screw extr. |
| Feed at throat | A + B + C | A + C | A + B | A |
| Downstream feed, zone 4 | D | B + D | D | B + D |
| Downstream feed, zone 6 | — | — | C | C |
| Melt temperature (°C.) | 260 | 260 | 260 | 264 |
| Properties |  |  |  |  |
| Notched Izod J/m (ftlbs/in), 23° C. | 128 (2.4) | 134 (2.5) | 144 (2.7) | 165 (3.1) |
| Flexural Modulus MPa (Kpsi) | 6641 (964) | 6610 (959) | 6435 (934) | 6463 (938) |
| Flexural strength MPa (Kpsi) | 174 (25.2) | 167 (24.3) | 180 (26) | 178 (25.8) |
| Tensile strength MPa (Kpsi) | 103 (15) | 101 (14.7) | 100 (14.6) | 105 (15.2) |
| Elongation at break (%) | 3.9 | 3.3 | 4.5 | 6.5 |
| DTUL (°C.) @ 1.82 MPa (264) psi, ann. | 176 | 173 | 178 | 182 |

Effect of the order of addition of components on the properties of PET molding compositions Table 2 indicates the advantage of adding the sodium ionomer nucleator after blending the PET and E-GMA first than adding prior to or during the blending of PET and

TABLE 3

| Composition: | Example 12 | Comparative Ex. 3 |
|---|---|---|
| PET (%) | 70 | 70 |
| E-GMA Copolymer (%) | 30 | — |
| E-EA-GMA terpolymer (%) | — | 30 |
| Blending process | Single screw extruder blended at 280° C. | Single screw extruder blended at 280° C. |
| Gasoline absorption (%) (3 mm thick tensile bars immersion) | | |
| After 7 days | 1.9 | 11.7 |
| After 21 days | 1.9 | 16.9 |

Effect of E-GMA copolymer vs E-EA-GMA terpolymer on the gasoline resistance of the PET blend Table 3 illustrates the gasoline resistance advantage that was found for the compositions comprising E-GMA copolymer vs. those comprising E-EA-GMA type terpolymers (Example 12 vs. Comparative Example 3).

EXAMPLE 13

A blend of 56.2 parts of poly(ethylene 2,6-naphthalene dicarboxylate), also referred to as polyethylene naphthalate (PEN, I.V.=0.54) and 2.6 parts of a polyether ester plasticizer (Plasthall, CP Hall) was extruded at 290 C. on a twin-screw extruder (Leistritz, 28 mm), while adding 10 parts of E-GMA copolymer (Lotador 8840) and 30 parts of glass fiber down stream at zone 4 and adding 1.2 parts of Na nucleator (1 part Aclyn 285 and 0.2 parts of sodium stearate) at zone 6. The blend extrudate was pelletized, dried and then injection molded (barrel temperature=290 C.; mold temperature=119 C.) into standard test bars. The properties are summarized in Table 4.

EXAMPLE 14

The procedure of Example 13 was followed, except 52.2 parts of PEN and 14 parts of E-GMA were used.

COMPARATIVE EXAMPLE 4

The procedure of Example 13 was followed, except that 66.2 parts of PEN and no E-GMA was used.

EXAMPLE 15

The procedure of Example 13 was followed, except recycled PET was used instead of PEN.

EXAMPLE 16

The procedure of Example 14 was used, except recycled PET was used instead of PEN.

TABLE 4

| | Comp Ex. 4 | Example 13 | Example 14 | Example 15 | Example 16 |
|---|---|---|---|---|---|
| Composition: | | | | | |
| A. PEN (%) | 66.2 | 56.2 | 52.2 | — | — |
| A'. PET (%) | — | — | — | 56.2 | 52.2 |
| B. E-GMA (%) | 0 | 10 | 14 | 10 | 14 |
| C. Na nucleator | 1.2 | 1.2 | 1.2 | 1.2 | 1.2 |
| D. Plasticizer (%) | 2.6 | 2.6 | 2.6 | 2.6 | 2.6 |
| E. Glass fiber (%) | 30 | 30 | 30 | 30 | 30 |
| Process | | | | | |
| | 1-pass twin screw extr. | 1-pass twin screw extr. | 1-pass twin screw extr. | 1-pass twin screw extr. | 1-pass twin screw extr. |
| Feed at throat | A + D | A + D | A + D | A' + D | A' + D |
| Downstream feed, zone 4 | E | B + E | B + E | B + E | B + E |
| Downstream feed, zone 6 | C | C | C | C | C |
| Melt temperature (°C.) | 288 | 290 | 298 | 280 | 280 |
| Properties | | | | | |
| N. Izod J/m (ftlbs/in), 23° C. | 69.4 (1.3) | 144 (2.7) | 160 (3) | 128 (2.4) | 133 (2.5) |
| Flex. Modulus MPa (Kpsi) | 9432 (1369) | 10,000 (1481) | 9820 (1425) | 7655 (1111) | 6380 (926) |
| Flex. strength MPa (Kpsi) | 184 (26.7) | 202 (29.4) | 187 (27.2) | 172 (24.9) | 166 (24.1) |
| Tensile strength MPa (Kpsi) | 164 (23.8) | 128 (18.6) | 144 (16.6) | 105 (15.3) | 97 (14) |
| Elongation at break (%) | 2.5 | 3.5 | 3.5 | 4.2 | 4.5 |
| DTUL (°C.) @ 1.82 MPa (264 psi) | 184 | 175 | 180 | 181 | 188 |

Molding compositions based on PEN vs PET
A combination of 1% E-AA, Na ionomer and 0.2% sodium stearate was used as nucleator Table 4 illustrates the unusually high modulus (modulus retention) exhibited by PEN molding compositions even after the addition of the low modulus impact modifier, E-GMA (Examples 13 and 14 vs. Comparative Example 4 as well as Examples 15 and 16).

EXAMPLE 17

A pellet blend of 61.8 parts of recycled PET and E-GMA copolymer (Lotador 8840) was extruded at 275 C., while adding 30 parts of glass fiber and 1.2 parts of the Na nucleator (Aclyn 285) downstream at zone 4. The compounded extrudate was pelletized at a throughput rate of 30 lbs/hr, collected and dried. The pellets were then injection molded (Van Dorn injection molder, barrel temperature=285 C.; mold temperature=119 C.) and tested. The properties of this composition are summarized in Table 5. This molding composition was used for fabricating an automotive structural part viz., a belt line reinforcement which is a component of an inner door module. The part was fabricated using a gas-assist injection molding process. The melt temperature was 299 C. and the mold temperature was 99 C.

TABLE 5

| | |
|---|---|
| Flexural Modulus MPa(Kpsi) @ 23° C., ASTM D-790 | 8,000(1,160) |
| Flexural strength MPa(Kpsi) @ 23° C., ASTM D-790 | 218(31.7) |
| Tensile Modulus, MPa ASTM D-638 | |
| @ 23° C. | 10,200(1,480) |
| @ 85° C. | 8,820(1,280) |
| Tensile strength, MPa(Kpsi) ASTM D-638 | |
| @ 23° C. | 135(19.6) |
| @ 85° C. | 78.5(11.4) |
| Elongation at break (%), ASTM D-638 | |
| @ 23° C. | 3.7 |
| @ 85° C. | 7.7 |
| Notched Izod J/m (ft · lbs/in), ASTM D-256 | |
| @ 23° C. | 128(2.4) |
| @ −29° C. | 112(2.1) |
| Instrumented Impact- total energy at failure J (ft · lbs), ASTM D-3763 | |
| @ 23° C. | 20(15) |
| @ −29° C. | 13.7(10.3) |
| Drop weight impact J(in lbs), @ 23° C., ASTM D-3029 | 3.3(30) |
| DTUL (°C.) @ 1.82MPa(264 psi), ASTM D-618 | 212 |
| Coefficient of linear thermal expansion (cm/cm/°C.) | $1.7 \times 10^5$ |
| Apparent melt viscosity (Pa · sec) @ 280° C. @ | |
| shear rate $(sec^{-1}) = 8.4$ | 1500 |
| shear rate $(sec^{-1}) = 167.5$ | 400 |
| shear rate $(sec^{-1}) = 1396$ | 130 |
| shear rate $(sec^{-1}) = 6981$ | 70 |

Properties of a typical composition used for gas-assist injection molding of automotive semi-structural parts (Example 17, 30% GF-nucleated PET pre-blended with 7% E-GMA)

What is claimed is:

1. A composition suitable for molding which comprises:
   (a) i) at least one thermoplastic polyester homopolymer selected from the group consisting of polyethylene terephthalate, poly-1,4-cyclohexane dimethylene terephthalate, polyethylene naphthalate, and mixtures thereof, and
   ii) at least one copolymer of ethylene and a glycidyl acrylate or methacrylate in which the glycidyl acrylate or methacrylate moiety is present in the copolymer in an amount of from about 2% to about 20% by weight, and wherein the copolymer contains more than 0 to about 30% by weight of an unsaturated comonomer selected from the group consisting of C3–C18 alpha olefins, styrenics and acrylics with a nitrile, amide or imide functionality; and
   (b) at least one nucleating agent which is a Group I metal salt of a carboxylic acid containing compound in an amount sufficient to increase the crystallization rate of the polyester.

2. The composition of claim 1 further comprising at least one reinforcing component selected from the group consisting of glass fibers and reinforcing fillers in an amount sufficient to increase the heat distortion resistance of the composition as compared to a similar composition without the reinforcing component.

3. A composition according to claim 1 wherein said composition has a flexural modulus of from about 1,000 to about 15,000 MPa under ASTM D-790, a notched Izod impact strength of at least about 70 Joules/meter under ASTM D-256, a softening temperature of at least about 150° C. and no substantial dimensional variations at temperatures ranging from about −40° C. to about 80° C.

4. A composition according to claim 2 wherein said composition has a flexural modulus of from about 1,000 to about 15,000 MPa under ASTM D-790, a notched Izod impact strength of at least about 70 Joules/meter under ASTM D-256, a softening temperature of at least about 150° C. and no substantial dimensional variations at temperatures ranging from about −40° C. to about 80° C.

5. A shaped article comprising a composition of claim 1.

6. A shaped article comprising a composition of claim 2.

7. A shaped article according to claim 5 wherein said article is prepared by injection molding.

8. A shaped article according to claim 6 wherein said article is prepared by injection molding.

9. A process for the production of a composition suitable for molding which comprises:
   (a) reacting (i) and (ii) to form an intermediate
      i) at least one thermoplastic polyester homopolymer selected from the group consisting of polyethylene terephthalate, poly-1,4-cyclohexane dimethylene terephthalate, polyethylene naphthalate, and mixtures thereof, and
      ii) at least one copolymer of ethylene and a glycidyl acrylate or methacrylate in which the glycidyl acrylate or methacrylate moiety is present in the copolymer in an amount of from about 2% to about 20% by weight, and wherein the copolymer contains from 0 to about 30% by weight of an unsaturated comonomer selected from the group consisting of $C_3$–$C_{18}$ alpha-olefins, stryenics, and acrylics with a nitrile, amide or imide functionality; and then
   (b) blending the resulting intermediate with at least one nucleating agent which is a Group I metal salt of a carboxylic acid containing compound in an amount sufficient to increase the crystallization rate of the polyester.

10. The process of claim 9 further comprising the step of blending at least one reinforcing component either with the thermoplastic polyester containing polymer before the reaction with component (ii); with the copolymer of ethylene and a glycidyl acrylate or methacrylate before the reaction with component (i); with the intermediate formed in step (a) or with the reaction product formed in step (b); wherein the reinforcing component is selected from the group consisting of glass fibers and reinforcing fillers and is blended in an amount sufficient to increase the heat distortion resistance of the composition as compared to a similar composition without the reinforcing component.

* * * * *